United States Patent [19]

Matsuo et al.

[11] 4,342,135
[45] Aug. 3, 1982

[54] DEVICE FOR MODERATING MOVEMENT OF LID

[75] Inventors: Hiroshi Matsuo; Nobuaki Omata, both of Hiroshima, Japan

[73] Assignees: Sharp Corporation, Osaka; Nifco Inc., Kanagawa, both of Japan

[21] Appl. No.: 192,644

[22] Filed: Sep. 30, 1980

[30] Foreign Application Priority Data

Oct. 3, 1979 [JP] Japan ............................ 54-136148[U]

[51] Int. Cl.³ ............................ E05F 3/14; E05D 1/02
[52] U.S. Cl. .......................................... 16/82; 16/225; 188/290
[58] Field of Search ................... 16/51, 54, 55, 82, 83, 16/84, DIG. 13, 225, 76, 77; 188/290, 306

[56] References Cited

U.S. PATENT DOCUMENTS

| | | | |
|---|---|---|---|
| 1,701,202 | 2/1929 | Dudley | 16/82 |
| 1,854,952 | 4/1932 | Nilson | 188/290 |
| 2,027,423 | 1/1936 | Gardiner | 16/84 |
| 2,184,607 | 12/1939 | Swanson | 16/58 X |
| 2,607,548 | 8/1952 | Hollander | 188/290 X |
| 3,173,222 | 3/1965 | Hansen | 16/225 X |
| 3,186,574 | 6/1965 | Davidson | 16/225 X |
| 3,302,741 | 2/1967 | Brazvk | 188/290 X |

FOREIGN PATENT DOCUMENTS

| | | | |
|---|---|---|---|
| 1289863 | 2/1969 | Fed. Rep. of Germany | 188/290 |
| 1404143 | 3/1965 | France | 16/225 |

*Primary Examiner*—Wm. Carter Reynolds
*Attorney, Agent, or Firm*—Trexler, Bushnell & Wolters, Ltd.

[57] ABSTRACT

The movement of a lid such as for a cassette holder in a cassette tape recorder is moderated by a device comprising only two component parts. At least one disc which is interlocked with a roller held in frictional engagement with part of the lid is contained together with damping oil within a housing composed of a pair of halved portions connected to each other through the medium of a hinge. The moderation of the lid movement is accomplished by the damping oil functioning to slow the rotation of the roller.

3 Claims, 9 Drawing Figures

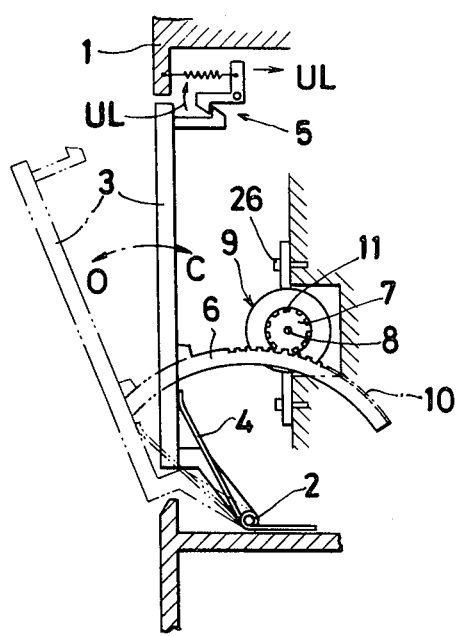
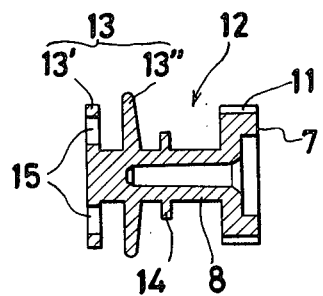
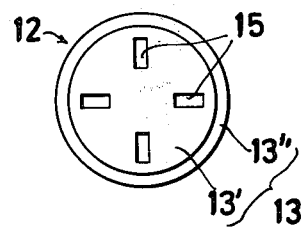
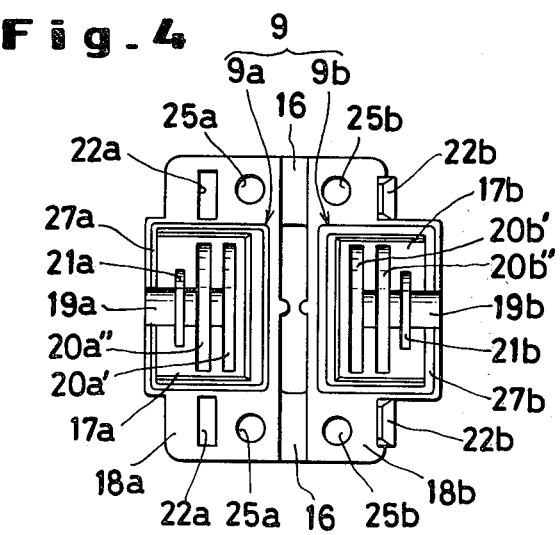

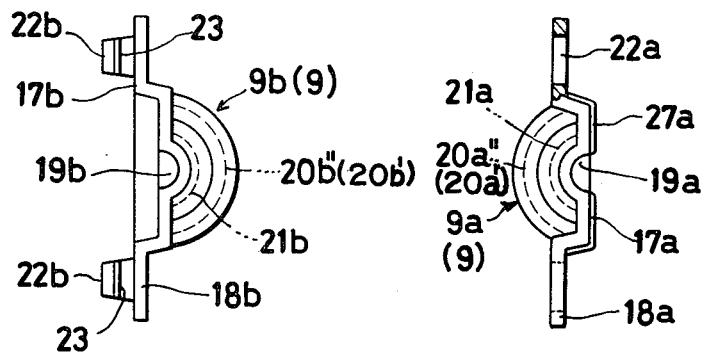
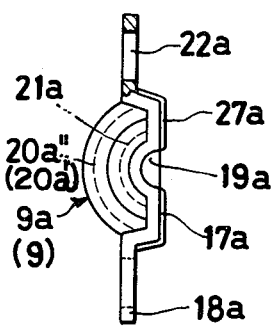
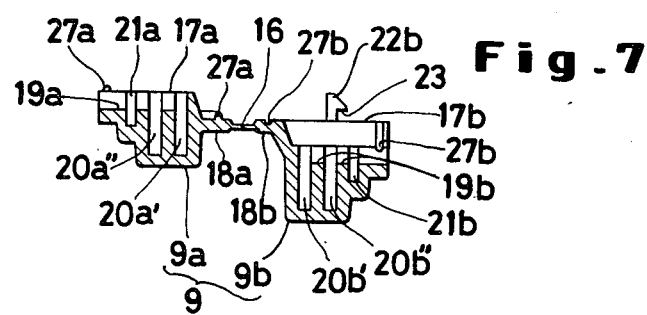
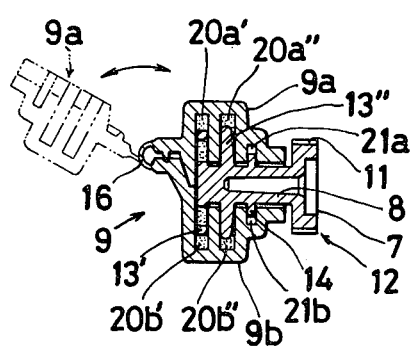
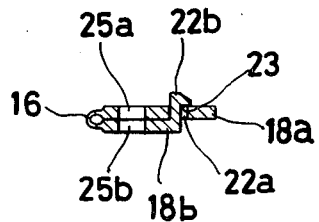

DEVICE FOR MODERATING MOVEMENT OF LID

BACKGROUND OF THE INVENTION

This invention relates to a device for moderating the movement of a lid such as for the cassette holder in a cassette tape recorder or deck, particularly where the movement of the lid during opening and closing of the lid is desired to be moderated so as to produce a smooth pleasing effect.

Generally, the mechanism for opening and closing the lid for the cassette holder in a cassette tape recorder is so designed that a push given to an eject button causes a spring to snap open the lid. When the lid is opened, the energizing force of the spring acts wholly upon the lid and causes the lid to open abruptly and, after the lid has reached the limit of its stroke, causes the lid to vibrate. When the lid is closed with the force of the finger tip from its opened position, the resisting force of the spring acts directly on the finger and gives an unpleasant sensation. In any event, the conventional devices do not give the impression of being sophisticated mechanisms.

Many attempts have heretofore been made to develop devices capable of properly moderating the movement of a lid, causing the lid, on release from its closed position, to be opened smoothly yet steadily and slowly and, on return to its closed position, to be closed with a proper positive sensation. Among the various devices developed for the control of lid movement, typical are those making use of mechanical frictional force and those incorporating rods in cylinders filled with oil. The devices of the former type have a constitutional problem in that the smoothness with which the lid movement is slowed or stopped is not sufficient and a disadvantage that their component parts tend to squeak because of friction. In the case of the devices of the latter type, since the linear motion of the piston causes the oil contained within the cylinder to move violently within the cylinder interior, the seal tends to be damaged often to the extent of causing oil leakage. Besides, these devices, as a whole, are apt to occupy large amounts of space. Worse still, these devices comprise numerous parts and, therefore, inevitably require much time and labor at the time of their assembly and prove expensive in many respects.

Other devices aimed at moderating lid movement by converting the movement into a rotation around an axis and damping the force of this rotation by means of an oil disposed around the axis of rotation have been also developed. In principle, the devices of this type are capable of producing a moderating force with a highly pleasing sensation. All the efforts made to minimize the number of component parts, however, have been unsuccessful in the devices of this type so far developed. Most of these devices require at least three or four component parts, which are difficult to shape and assemble.

SUMMARY OF THE INVENTION

One object of this invention is to provide a device for moderating lid movement, which comprises the least possible number of component parts and produces a smooth moderating force.

To accomplish the object described above according to this invention, there is provided a device for moderating lid movement, which device comprises a rotary member composed of a rotary shaft and at least one disc formed at one terminal side of the rotary shaft, and a housing composed of a pair of halved portions connected to each other through the medium of a hinge, the halved portions being laid to overlap each other to form an empty space for accommodating the rotary shaft and the disc.

Damping oil is contained along with the rotary shaft and the disc within the empty space formed in the housing thereby effecting to moderate the movement of the rotary shaft. This device is arranged in the moving mechanism of the lid for a cassette holder in such a manner that the rotary shaft is frictionally connected to the lid of the holder by means of a roller integrally provided on the free end of the rotary shaft, and consequently, the moderation of the lid movement is accomplished.

The other objects and characteristics of the present invention will become apparent from the further disclosure of the invention to be given hereinafter with reference to the accompanying drawings.

BRIEF EXPLANATION OF THE DRAWINGS

FIG. 1 is a sectioned view illustrating a typical machine portion to which the device of this invention is applied.

FIG. 2 is a longitudinal sectioned view of a rotary member to be used in one preferred embodiment of this invention.

FIG. 3 is a rear view of the same rotary member.

FIG. 4 is a plan view of a corresponding housing in an opened state.

FIG. 5 is a front view of the same housing.

FIG. 6 is a rear view of the same housing.

FIG. 7 is a lateral sectioned view of the same housing.

FIG. 8 is a lateral sectioned view of the housing in a closed state.

FIG. 9 is a sectioned view of the important part of a complementary engaging means.

DESCRIPTION OF THE PREFERRED EMBODIMENTS

Generally, as illustrated in FIG. 1 which is a lateral sectioned view of part of a cassette tape recorder, the tape holder in a cassette tape recorder has a construction such that a lid 3 is disposed rotatably on a pivot 2 so as to be opened and closed relative to the recorder body and suitable spring means 4 is utilized for keeping the lid 3 energized at all times in the direction of opening the lid (indicated by the arrow O). When the lid 3 is in a closed state, suitable lock means 5 serves to keep the lid 3 in the closed state against the energizing force exerted by the spring 4. When this lock is released (in the direction of the arrow UL) by the operation of a separately disposed eject button (not shown), for example, the lid 3 is automatically pushed and opened by the energizing force of the spring 4.

A lid with this construction, however, is opened so abruptly as to produce vibration or sustain breakage or cause other adverse effects. To overcome such difficulties, various damping means have been adopted for the purpose of moderating the lid movement. Some of them fail to produce the desired effects and others involve structural complications. The present invention, therefore, provides a device for moderating lid movement, which is simple in construction and easy to assemble and highly effective in enabling the lid to be opened and closed in a fully moderated manner.

Roughly, the device of the present invention operates on the principle of utilizing damping oil for moderating the rotation of a rotary shaft 8 and a roller 7 which is kept in mesh with at least one side of a moving member 6 adapted to move in conjunction with the lid 3 as illustrated in FIG. 1. Specifically, the device comprises the roller 7, the rotary shaft 8 thereof and a housing for tightly containing the oil serving to damp the rotation of the rotary shaft 8.

In the illustrated embodiment, the moving member 6 is in an arcuate shape and is provided with a rack gear 10 on the side kept in mesh with the roller. The roller 7 is provided on the peripheral surface thereof with a pinion gear 11 adapted to engage with the rack gear 10. These two gears are meshed so that when the arcuate moving member 6 moves in a longitudinal direction in consequence of the movement of the lid 3, the roller 7 rotates about its axis while smoothly rolling on the arcuate moving member. In other words, when a braking force is applied to the roller 7, the braking force is fully transmitted to the lid via the arcuate moving member 6. The safe transmission of this force need not rely solely on the meshed gears as adopted in the embodiment so far described. Alternatively, this transmission is obtained by having at least the corresponding side of the arcuate moving member 6 or the peripheral surface of the roller 7 finished coarsely or coated with rubber. Generally speaking, frictional engagement of any form to be established between the arcuate moving member and the roller will suffice for this purpose.

Now, the moderating device or damper of the present embodiment which substantially comprises the roller 7, the rotary shaft 8 of the roller and the housing 9 encasing the rotary shaft will be described with reference to FIG. 2 and other figures.

FIGS. 2 and 3 illustrate a rotary member 12 which has the aforementioned roller 7 disposed at one terminal side of the rotary shaft 8. The rotary member 12 is provided at the other terminal side of the rotary shaft 8 with a radially expanded portion 13. Essentially this portion 13 is destined to receive the braking force exerted by the damping oil as described fully afterward.

In this embodiment, the radially expanded portion 13 is composed of a pair of slightly separated discs 13', 13''. The portion of the shaft which intervenes between the roller 7 and the disc 13'' nearer to the roller 7 is provided with a small disc portion 14 expanded radially with a relatively small diameter. In the disc 13' situated at the farthest end of the shaft 8, a plurality, four specifically in the illustrated embodiment, of axial perforations 15 are formed at fixed circumferential intervals.

The rotary member 12 of the construction described above is one independent part molded integrally of a suitable plastic material. The functions to be fulfilled by the component parts of the rotary member will be described below with reference to the function of the housing.

FIG. 4 to FIG. 7 illustrate the housing 9 of an independent construction similarly molded integrally of a plastic material.

The housing 9 is composed of a pair of halved portions 9a, 9b which are connected to each other through the medium of a hinge 16 formed in a reduced thickness so as to be more flexible. In the illustrated embodiment, the halved portions 9a, 9b have semicylindrical shapes as though obtained by equally halving one cylinder along a plane passing through the axis of the cylinder. They are connected to each other through the medium of the hinge 16 in such a manner that they are opposed back to back to each other in the axial direction, with the imaginary surfaces of division 17a, 17b both kept in the upward direction. In the present embodiment, the halved portions 9a, 9b possess base plates 18a, 18b which are parallel to the plane including the hinge 16. Structurally, therefore, this hinge 16 serves to connect indirectly the halved portions 9a, 9b to each other by directly connecting the opposed edges of the base plates 18a, 18b.

The aforementioned imaginary surfaces of division 17a, 17b serve as surfaces of abutment for the respectively opposite halved portions. When the two halved portions 9a, 9b are rotated toward each other about the hinge 16 and brought into intimate contact, these surfaces of abutment 17a, 17b adjoin each other. The union of the two halved portions will close the housing interior.

In the inside of the housing thus closed, there will be formed spaces for embracing the rotary shaft 8 and the discs 13, 14 of the aforementioned rotary member 12. While the halved portions are kept apart from each other as illustrated in FIGS. 4-7, these spaces are similarly halved in the shape of semicircular grooves and kept in the respective halved portions.

Specifically in the halved portions 9a, 9b, axially semicircular grooves 19a, 19b opening on the side opposite the surface containing the hinge 16 are formed. These grooves serve to accommodate the portion of the rotary shaft 8 of the rotary member extending behind the roller 7.

Perpendicularly to these axially semicircular grooves 19a, 19b, grooves 20a', 20a'', 21a and 20b', 20b'' and 21b are formed in radial directions at the axial positions of the discs 13', 13'' and 14 of the rotary shaft 8 in respective sizes generally conforming to those of the discs. Actually, however, the grooves 20a', 20a'' and 20b', 20b'' corresponding to the first and second discs 13', 13'' are formed in sizes larger than the diameters and/or thicknesses of the respective discs, whereas the grooves 21a, 21b corresponding to the small disc 14 are formed in sizes equal to or slightly smaller than the diameter and the thickness of the small disc 14. Of course, these grooves in one halved portion and those in the other halved portion are symmetrical relative to a plane perpendicularly intersecting the axis of the hinge 16.

The housing of such a construction as described above and the rotary member 12 are assembled as described below.

As the first step, the rotary shaft 8 and the discs 13', 13'' and 14 of the rotary member are inserted into the grooves 19b, 20b', 20b'' and 21b of one of the halved portions (referred to as 9b). After the insertion, the roller 7 remains outside the housing.

In the resultant state, the grooves 20b', 20b'' which have received the discs 13', 13'' still retain gaps because of the aforementioned size relationship. A suitable amount of damping oil such as, for example a highly viscous sillicone oil, is poured into the gaps. Of course, the oil may be placed in the grooves 20b', 20b''0 in advance of the insertion of the respective parts of the rotary member.

Subsequently, the remaining halved portion 9a is rotated about the hinge 16 and brought into intimate contact with the other halved portion 9b which has already received the rotary member 12, with the result that the housing is closed. In order to keep the two halved portions 9a, 9b in intimate contact with each other and prevent them from accidental separation, the two halved portions 9a, 9b are provided respectively with complementary engaging means 22a, 22b adapted to come into mutual engagement when the halved portions are brought into intimate contact (FIGS. 4–7). In the present embodiment, one of the halved portions, 9b is provided on the base plate 18b with a pair of hooks intended to serve as one complementary engaging means 22b. The other halved portion 9a is provided on the base plate 18a at the corresponding positions with perforations intended to serve as the other engaging means 22a. By causing the expanded heads of the hooks to be passed in a retracted form through the perforations and then allowing the heads to return to their original shape and consequently come into hooked engagement with the edges of the perforations by utilizing the steps formed below the heads, the two halved portions are brought into snapped engagement with each other (FIG. 8).

The complementary combination of such snap engaging means may freely be selected from among various engaging devices known to the art.

At any rate, the intimate contact closes the two halved portions 9a, 9b to give rise to the housing 9. Inside the housing, the semicircular grooves formed in the halved portions are mutually combined to give rise to the spaces for embracing the component parts of the rotary member.

As a result, the radially expanded portions 13', 13" of the rotary member are directly exposed to the damping force of the oil contained within the closed gaps. When the roller 7 which is exposed outside the housing is dynamically meshed with the arcuate moving member 6 adapted to move in conjunction with the lid 3, the damping force can be applied smoothly to the lid movement. In this case, with a view to facilitating the attachment of the housing at the prescribed position, matched perforations 25a, 25b may be bored in the pair of base plates 18a, 18b, for example, so that accurate positioning of the housing will be obtained by passing setting screws 26 (FIG. 1) through the matched perforations.

The damping force in the device of this invention is affected by the viscosity of the oil actually used as the damping medium. Besides, the damping force can be enhanced by causing the oil to flow in the axial direction to offset the flow of the oil in the direction of the rotation such as is accomplished by the axial perforations 15 formed in the first disc 13' as described above. This damping force can further be adjusted by suitably selecting the number and designing the shape respectively of these perforations 15. In the illustrated embodiment, the radially expanded portion 13 for receiving the damping force is composed of two discs 13', 13". It may, however, be formed of just one disc or three or more discs. The selection of the number of discs is purely a matter of design. They need not be limited to discs. For example, a suitable number of suitably shaped vanes radially projecting from the rotary shaft 8 will suffice.

In the present embodiment, the small disc 14 is located close to the roller 7 of the rotary shaft 8 and is adapted to rotate within the corresponding space (21a, 21b) of a slightly smaller size as described above. The tight fitting of this small disc in the space serves as an oil seal. Since the oil leakage tends to occur through the opening of the axial grooves (19a, 19b) for receiving the rotary shaft, the small disc 14 is intended to preclude possible oil leakage in the axial direction.

Prevention of oil leakage may be further ensured by forming a ridge 27a all around the edge of one halved portion to enclose all the spaces (FIGS. 4, 6 and 7) and a matched groove 27b all around the edge of the other halved portion (FIGS. 4 and 7) so that when the two halved portions are closed onto each other, the ridge and the groove fit into each other and function to seal the interior. To seal the housing more perfectly, the joined edges of the two halved portions may be fused by means of ultrasonic welding.

In the illustrated embodiment, one of the halved portions, 9a, is slightly raised from the base plate 18a and the other halved portion 9b is reversely depressed below the base plate 18b. In this arrangement, when the two halved portions are brought into mutual contact, the raised halved portion is in effect inserted into the depressed halved portion, facilitating the job of joining them exactly in position. Otherwise, the two halved portions may be formed flush with their respective base plates. While the two halved portions in the present embodiment are formed so as to be axially symmetrical back to back with respect to the hinge 16, they may be otherwise joined laterally with their opposed lateral edges connected to each other through the medium of a hinge.

In the construction illustrated in FIG. 1, since the lid 3 is opened and closed relative to the recorder body 1 by being rotated around the pivot 2, the moving member 6 with which the roller 7 is meshed is formed in an arcuate shape. When the lid 3 is linearly opened and closed by being moved parallelly to the recorder body 1, the moving member 6 which is moved in conjunction with the lid may be formed in a straight shape.

According to the present invention, the device for moderating the lid movement by means of oil damping can be obtained with only two component parts, i.e. the rotary member and the housing which are each molded integrally. Thus, this device promises ample reduction of cost and generous saving of time and labor at the time of the assembly. The minimization of the number of component parts further lowers the frequency of mechanical trouble and enhances the reliability of performance.

What is claimed is:

1. A device for moderating the movement of a lid, comprising:
    a rotary member composed of a rotary shaft, a roller integrally formed at one terminal side of said rotary shaft and adapted to be held in frictional engagement with a member imparted motion by the lid and at least one disc formed at the other terminal side of said rotary shaft; and
    a housing composed of a pair of halved portions connected to each other through the medium of a hinge, said halved portions being provided with complementary engaging means adapted to come into mutual engagement when the halved portions are rotated about said hinge toward each other and brought into intimate contact with each other, and said halved portions containing semicircular grooves adapted to form empty spaces for accommodating the rotary shaft and the discs of said rotary member and damping oil when the halved portions are joined to each other.

2. The device according to claim 1, wherein a small disc is disposed around the rotary shaft between the roller and the disc of said rotary member and an empty space for admitting forced insertion of said small disc is formed in the housing, whereby the housing ensures prevention of oil leakage.

3. The device according to claim 1, wherein at least one disc of said rotary member is provided with perforations adapted to regulate the damping force exerted by the oil.

* * * * *

UNITED STATES PATENT AND TRADEMARK OFFICE
CERTIFICATE OF CORRECTION

PATENT NO. : 4,342,135
DATED : August 3, 1982
INVENTOR(S) : Hiroshi Matsuo et al.

It is certified that error appears in the above-identified patent and that said Letters Patent is hereby corrected as shown below:

Column 4, line 60, cancel "O".

Signed and Sealed this

First Day of November 1983

[SEAL]

Attest:

Attesting Officer

GERALD J. MOSSINGHOFF

Commissioner of Patents and Trademarks